United States Patent [19]
Stoll et al.

[11] Patent Number: 5,682,918
[45] Date of Patent: Nov. 4, 1997

[54] PRESSURE CONTROL VALVE

[75] Inventors: Kurt Stoll; Volker Quendt, both of Esslingen, Germany

[73] Assignee: Festo KG, Esslingen, Germany

[21] Appl. No.: 598,359

[22] Filed: Feb. 8, 1996

[30] Foreign Application Priority Data

Feb. 10, 1995 [DE] Germany ............... 195 04 364.2

[51] Int. Cl.$^6$ .................................................. F15B 13/042
[52] U.S. Cl. ................. 137/85; 137/596.18; 137/627.5
[58] Field of Search ...................... 137/85, 596.18, 137/627.5

[56] References Cited

U.S. PATENT DOCUMENTS

| | | | |
|---|---|---|---|
| 2,012,596 | 8/1935 | Anderson | 137/596.18 X |
| 2,985,490 | 5/1961 | Gates | 137/596.18 X |
| 3,354,894 | 11/1967 | Stoll | 137/627.5 X |

FOREIGN PATENT DOCUMENTS

| | | | |
|---|---|---|---|
| 2138658 | 2/1973 | Germany | 137/627.5 |
| 30 40 444 | 7/1981 | Germany. | |
| 37 22 315 | 1/1989 | Germany. | |
| 5-158552 | 6/1993 | Japan. | |

*Primary Examiner*—Gerald A. Michalsky
*Attorney, Agent, or Firm*—Hoffmann & Baron, LLP

[57] ABSTRACT

A pressure control valve, which possesses a primary pressure port, a secondary pressure port and a venting port. For control of the secondary pressure a valve operating device is present which is actuated by a control pressure present in a control chamber. A mechanical spring device urges the valve operating device against the direction of action of the control pressure in such a manner that when ambient pressure obtains in the control chamber, it automatically assumes a basic setting, in which the secondary pressure port is connected with the venting port for fluid flow. It is in this manner that there is an automatic venting of the secondary pressure port when the control chamber is free of pressure.

9 Claims, 2 Drawing Sheets

PRESSURE CONTROL VALVE

BACKGROUND OF THE INVENTION

The invention relates to a pressure control valve comprising a primary port for the supply of fluid, a pressure controlled secondary pressure port for connection with a load, a venting port and furthermore a valve operating means which is able to be positioned by means of a variable control pressure, obtaining in a control chamber, in different positions of control including a neutral setting, at least one supply setting and at least one venting setting, the secondary pressure port being in the neutral setting separated both from the primary pressure port and also from the venting port, whereas in the possible supply and venting settings it is connected either with the primary pressure port or with the venting port and simultaneously is separated from the respective other port.

THE PRIOR ART

A pressure control valve of this type is disclosed in the unexamined Japanese patent publication JP-H5-158 552. Responsive to a varying preset of the control setting of the valve operating device it regulates the secondary pressure, which is less than the primary pressure, to a pressure value as desired by a load connected with the valve. In order to increase the secondary pressure, the valve operating device is maintained in secondary pressure, the valve operating device is maintained in a supply setting, while a reduction of the secondary pressure is caused by positioning the valve operating device in a venting setting. For preset of a respective control setting a variable control pressure is employed, which acts on the valve operating member and is made available in a control chamber.

Operation of this prior art pressure control valve leaves to be desired in a certain respect to the extent that complete venting of the secondary pressure port is not as a rule possible. Even on complete venting of the control chamber with the result that ambient pressure, that is to say the atmospheric pressure, will obtain, the valve operating device will assume the neutral setting before the secondary pressure port is completely devoid of pressure. Complete venting of the secondary pressure port is consequently only possible by adopting additional measures, as for example by adding a separate venting valve in the connection between the secondary pressure port and the associated load.

SHORT SUMMARY OF THE INVENTION

One object of the invention is to provide a pressure control valve of the type initially mentioned which, without having recourse to external means renders possible complete venting of the secondary pressure port.

In order to achieve these and/or other objects appearing from the present specification, claims and drawings, in the present invention the valve operating device is so subjected to a mechanical spring device opposing the direction of action of the control pressure that if the ambient pressure obtains in the control chamber it automatically assumes a basic setting, which is the same as a venting setting.

It is in this manner that the invention ensures that when the control chamber is completely vented the secondary pressure port is automatically rendered pressure-less as well without any external valve devices having to be operated. As a rule the valve operating device, is subject to further effects apart from the mechanical spring device, which affect the necessary valve operating force. Here it may be a question of frictional forces or the resilient forces of other spring arrangements which are out of balance owing to inaccuracies in manufacture. By having a suitable design of the additional spring device opposing the control pressure it is possible to ensure that, irrespectively of the said effects, there is a small venting setting at least, if the control pressure is equal to the ambient pressure, that is to say there is no gage pressure.

Further advantageous developments of the invention are defined in the claims.

It is convenient if the spring device counter-acting the control pressure is so designed that the transfer flow cross section, available for the fluid in the basic setting, between the secondary pressure port and the venting port is less than the maximum transfer flow cross section able to be set during operation of the pressure control valve. This ensures that the pressure differential (offset) between the control pressure and the secondary pressure is as low as possible so that the pressure values to be made available for the operation of the pressure control valve, of the control pressure may be kept low.

It is convenient if the valve operating device comprises a preferably rod-like valve operating member, which during control movements may act on two closure members, able to be moved in relation to it, of which one is associated with a transfer opening between the secondary pressure port and the primary pressure port and the other is associated with a transfer port between the secondary pressure port and the venting port. The closure members are biased by spring arrangements independent of the mechanical spring device, into a closed setting closing the associated transfer port, which closed setting is assumed by the same in the neutral setting of the valve operating device. Actuation portions provided on the valve operating member will act, during setting of the valve operating member dependent on the direction in which same shifts, in the opening direction on the one or on the other closure member, whereas the other one will remain unchanged in the closed setting.

The closure members are preferably arranged in an axially shifting manner on the valve operating member, which may extend through them.

It is preferred for the valve operating member to be suspended in a movable manner on the valve housing by means of a flexible and preferably elastic diaphragm. This diaphragm constitutes a wall section of the control chamber so that when subjected to the control pressure it renders the necessary control movement possible.

On the side, which is opposite to the control chamber, of the diaphragm there is preferably a counter-pressure chamber, which is always in communication with the secondary pressure port, the spring device responsible for the basic setting preferably being accommodated in the counter-pressure chamber.

In order to ensure that the fluid under pressure present at the different ports does not entail any spurious effect on the control characteristic, the closure members are preferably equalized as regards pressure force. In order to achieve this the end surfaces, opposite to the associated valve seat, of the two closure members may be equal in size and always be subjected to the secondary pressure.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
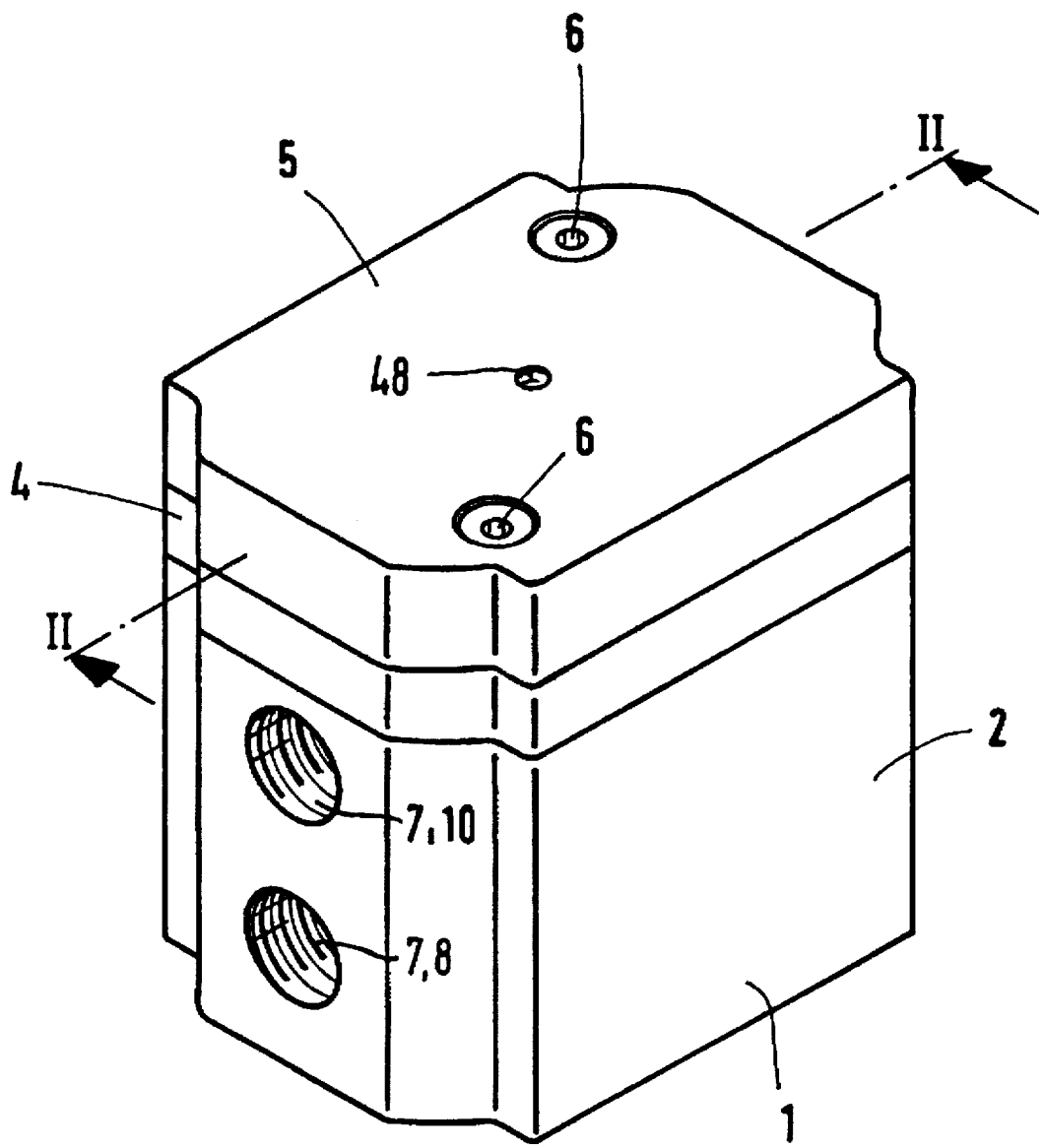
FIG. 1 shows the pressure control valve in accordance with the invention as a first possible embodiment in a perspective elevation.

The pressure control valve, which for instance is a pneumatic control valve, is a rate amplification valve or may also be termed a pneumatic booster. In the case of a pressure amplification of for example 1 to 1 it may substantially increase the flow rate through a small pilot control valve. It is mainly employed in proportional applications.

The pressure control valve possesses a multi-part valve housing 1, comprising a base member 2, an intermediate plate 4 fitted to an axial end surface 3 of the base member 2 and a terminating plate 5 seated on the intermediate plate 4. The terminating plate is screwed to the base member 2 using screws 6 so that the intermediate plate 4 placed in between is also held in place.

On the lateral external surface of the base member 2 a plurality of openings 7 are located, which are associated with a primary pressure port (P) 8, a secondary pressure port (A) 9 and a venting port (R) 10.

The above mentioned ports 8, 9 and 10 open in the interior of the base member 2 into an axially extending receiving space 13 for parts of a valve operating device generally referenced 14 accommodated in the valve housing 1. The receiving space 13 is essentially cylindrical while being multiply stepped in the longitudinal direction.

At the axial end surface 3 the receiving space 13 opens into a working space 17, formed in the intermediate plate 4 and/or the terminating plate 5. On the opposite end surface 15, facing downward in terms of FIG. 2, the receiving space 13 is shut off by a sealing cover 16, inserted into it, in an air-tight fashion.

The valve operating device 14 surrounds a rod-like valve operating member 18, which extends coaxially in the receiving space 13 and has an end section 22 projecting into the working space 17. On the end section 22 an actuating device 23 is arranged dividing the working space 17 axially, and with a sealing effect, into a control chamber 24 associated with the terminating plate 5, and a counter-pressure chamber 25, associated with the base member 2. The actuating device 23 is able to be moved jointly with the valve operating member 18 in the longitudinal direction of the working space 17. The corresponding motion thereof will be herein referred to as the control movement. The receiving space 13 is directly connected with the counter-pressure chamber 25.

The secondary pressure port 9 is connected via a first transfer opening 26, delimited in the receiving space 13, with the primary pressure port 8. Moreover it is connected via a second transfer opening 27, which is arranged with an axial distance from the first transfer opening 26 and also located in the receiving space 13, with the venting port 10. By means of the control movement of the valve operating member 18 the transfer flow cross sections made available by the transfer openings 26 and 27, may be steplessly varied.

In the intermediate section 28 arranged axially between the two transfer openings 26 and 27 the secondary pressure port 9 opens into the receiving space 13. The primary pressure port 8 opens into the first terminal section 32, which in the direction of the cover 16 axially adjoins the first transfer opening 26, of the receiving space 13. The venting port 10 opens into the second terminal section 33 of the receiving space 13, which is located on the axial side, opposite to the first terminal section 32, of the intermediate section 28. The first terminal section 32 is limited by the cover 16. The second terminal section 33 is shut off by a partition 34 from the adjoining counter-pressure chamber 25.

Each transfer opening 26 and 27 is surrounded by an annular valve seat 35 and 36 integral with the housing and directed axially away from the intermediate section 28. In the first terminal section 32 there is a first closure member 37, and in the second terminal section 33 there is a second closure member 38. Both of the closure members 37 and 38 are able to be axially moved in the associated terminal section 32 and 33 so that the possible direction of motion is the same as the direction of control movement of the valve operating member 18.

Each closure member 37 and 38 may assume a closed setting, in which it sealingly abuts the associated valve seat 35 and 36 and consequently completely shuts off the associated transfer opening 26 and 27. In this case the connection of the secondary pressure port 9 with the associated primary pressure port 8 and, respectively, the venting port 10 is interrupted. Furthermore each closure member 37 and 38 may assume different opening settings, in which it is lifted to a greater or lesser extent from the associated valve seat 35 and 26 so that in accordance with the degree of opening it may make available different transfer flow cross sections for the fluid.

Each closure member 37 and 38 is urged by a spring arrangement 42 in the closing direction. In the embodiment this spring arrangement is constituted by a helical compression spring. It bears at one end against the respective closure member 37 and 38 and at the other end against the associated cover 16 or respectively against the partition 34. If there is no opposing force the closure members 37 and 38 are held in the closed settings by the force of the spring arrangements 42.

The first closure member 37 is guided for axial movement in a recess 43 in the cover 16. Adjacent to the abutment contact there is a sealing action which is for example caused by a sealing ring 44 arranged on the moving closure member 37, such sealing action preventing fluid present at the primary pressure port 8 from flowing into the recess 43.

In a similar manner the second closure member 38 is slidingly arranged for axial movement in a through opening 45 extending through the partition 34. A sealing ring 44' prevents the flow of fluid between the counter-pressure chamber 25 and the second terminal section 33 of the receiving space 13.

In a preferred embodiment of the invention the two closure members 37 and 38 have the valve operating member 18 extending coaxially through them as illustrated in the figures. In this respect a respective closure member 37 and 38 and the valve operating member 18 are able to move axially in relation to one another. Each closure member 37 and 38 is however provided with a movement limiting abutment, termed an actuating portion 46 and 46', which is fixedly and more especially integrally associated with the valve operating member 18. The arrangement is such that the actuating portions 46 and 46' may only act against the closing force of the spring arrangements 42 on the associated closure member 37 and 38. In the embodiment they are located in the length section of the valve operating member 18 which extends axially between the two closure members 37 and 38. In the present case they take the form of radial projections which more particularly extend in an encircling manner, and may abut against the facing end surface 47 of the respective closure member 37 and 38. The axial distance between them is so selected that same just make contact with the two end surfaces 47, when the two closure members 37 and 38 are in the closed setting.

This setting of the valve operating member 18 or, respectively, of the entire valve operating device 14 will be termed the neutral setting. In it the secondary pressure port 9 is separated in a fluid-tight fashion both from the primary pressure port 8 and also from the venting port 10.

During operation of the pressure control valve pneumatic fluid will be present at the primary pressure port 8. The respective opening 7 is for this purpose connected with a suitable source of fluid under pressure. The secondary pressure port 9, which constitutes the working port, is connected with a load, which is supplied with fluid at a certain rate, said fluid being at a secondary pressure which is as constant as possible. This secondary pressure may be the same as the primary pressure, but will typically be lower. The level of the secondary pressure is set by the valve operating device 14.

Once the secondary pressure has reached the desired level, the valve operating device 14 will dwell in the neutral setting as explained. If the secondary comparatively goes down below the desired value, the valve operating member 18 will shift toward the lower end surface 15, its first actuating portion 46 lifting the first closure member 37 clear of the associated valve seat. Accordingly fluid will flow out from the primary pressure port 8 to the secondary pressure port 9, something which will cause an increase in pressure here. The respective control setting of the valve operating device 14 will be termed the supply setting. Different supply settings are possible, which respectively differ by the amount of the transfer cross section which is respectively available. In all supply setting the second transfer opening 27 remains closed. Owing to the relative movement between the moving valve operating member 18 and the stationary second closure member 38 in this case the actuating portion 46' will have moved a greater or lesser distance from the end surface 47 of the associated with second closure member 38.

Figure 2:
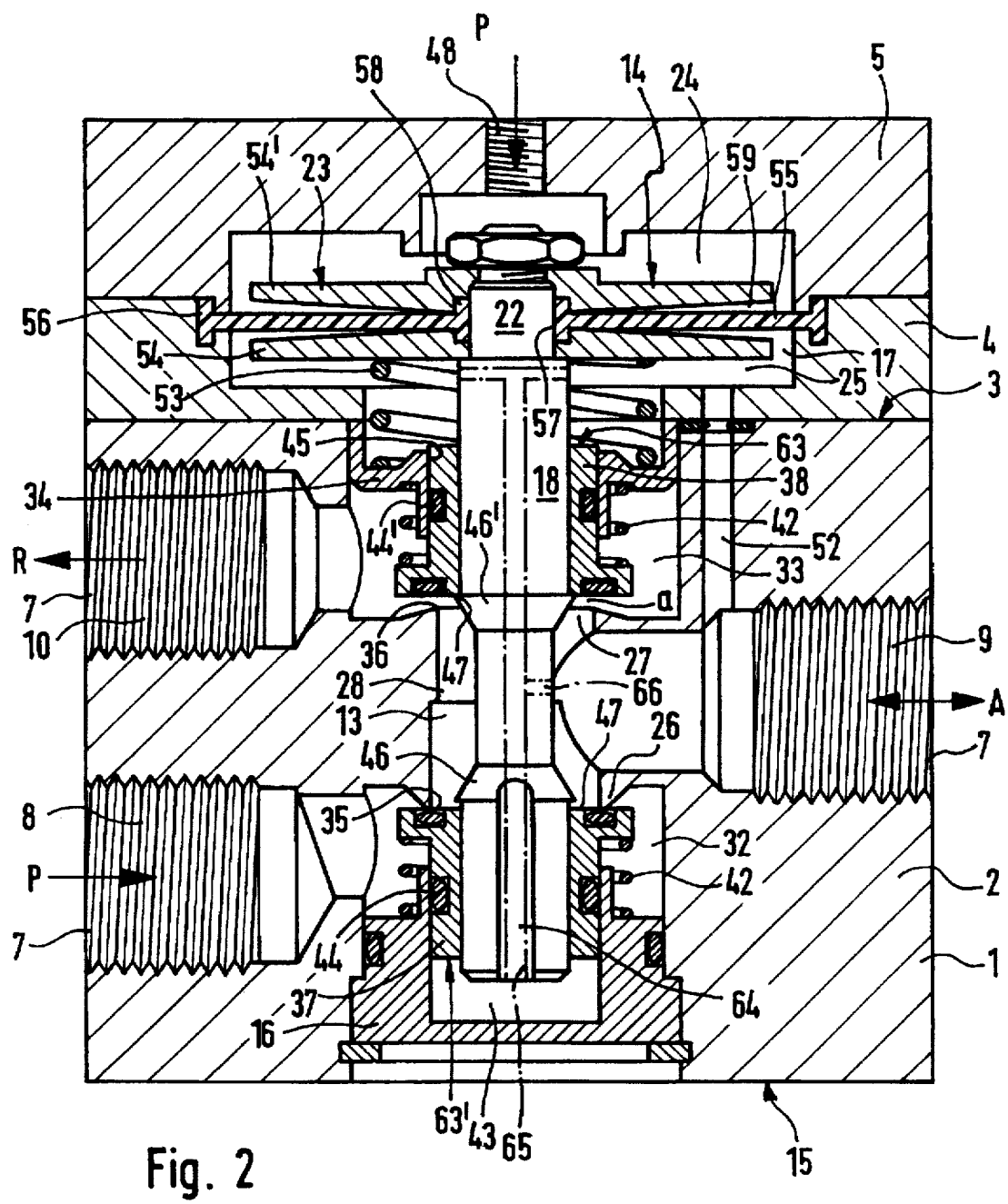
FIG. 2 shows the pressure control valve of FIG. 1 in a longitudinal section taken on the section line II—II in the basic setting.

Should the secondary comparatively exceed the desired value, the valve operating member 18 will shift in the opposite direction, i.e. in FIG. 2 upward. As soon as the actuating portion 46' has reached the second closure member 38, same will be lifted clear of the first valve seat 36, the first transfer opening 26 having closed again at the time of such lifting. It is now possible for fluid to flow out from the secondary pressure port 9 via the venting port 10. The respective control setting will be termed the venting position. In this case as well different venting settings are possible in accordance with the size of the transfer cross section available at the second transfer opening 27.

The regulation movement as described of the valve operating device 14 is affected by a control pressure $P_{STEUER}$, which pressurizes the control chamber 24. It is supplied for example via a control channel 48 opening at the end surface 5 of the terminating plate 5. The control pressure acts on the actuating device 23, which is connected with the valve operating member 18, so that the valve operating member 18 is urged toward the supply setting. The control pressure is opposed by the secondary pressure obtaining at the time in the counter-pressure chamber and which is present in the counter-pressure chamber 25. For this purpose the counter-pressure is connected via a connecting channel 52, provided in the valve housing 1, with the secondary pressure port 9.

In this manner the secondary pressure acts via the actuating device 23 on the valve operating member 18 toward the venting setting. The opposite force then having the opposite effect to the control force is however enhanced by a mechanical spring device 53, constantly urging the valve operating member 18 toward the venting settings. In a preferred embodiment this spring device 53 is, as illustrated, in the counter-pressure chamber. Here it is constituted by a helical compression spring, whose one end bears against the wall part integral with the housing and formed by the partition 34, of the counter-pressure 25 and whose other end bears against the actuating device 23 extending away from the valve operating member 18 as a sort of radial projection.

The varying control pressure $P_{STEUER}$ is preferably supplied by a pilot valve device, not illustrated. Its value will be dependent on the true or actual value of the secondary pressure, which may be detected using a pressure sensor, which is not illustrated, dependent on whose level the pilot valve device is operated. The control pressure may for example be provided using switching valves operated with pulse duration modulation or in some other fashion.

The spring device 53 ensures that the valve operating device 14 assumes a basic position when control chamber 24 is pressure-less, as is indicated in FIG. 2 by way of example. This basic setting is a venting setting, as has already been mentioned. Said basic setting will be automatically assumed by the valve operating device 14, when the control pressure is equal to zero, i.e. is equal to the ambient pressure applying.

In that manner it is possible to use simple venting of the control chamber 24 to achieve a complete venting of the secondary pressure port 9 via the venting port 10. This is how residual pressure, which would be disadvantageous for following operation, is prevented at the secondary pressure port 9.

It will be clear that in the embodiment the parts of the device are so matched to each other that the transfer cross section a made available in the basic setting between the secondary pressure port 9 and the venting port 10 is less than the maximum transfer flow cross section possible on maximum shift or deflection of the associated second closure member 38. The minimum venting setting in itself is sufficient to produce the desired effect. Preferably this renders possible the employment of a comparatively weak spring device 53 so that no excessively increased control pressure $P_{STEUER}$ is required in order to operate the pressure control valve.

In the completely pressure-less state of the pressure control valve it is best, in view of a mechanical equilibrium of forces between the above mentioned spring device 53 and the closure member 38 associated with the venting port 10 for the valve operating device 14 to be locked in the basic setting.

The actuating device 23 in accordance with the present embodiment comprises two actuating disks 54 and 54', arranged in an axially staggered fashion, which are placed coaxially in relation to the valve operating member 18 and fixed thereto, for example by a screw fastener connection. Their external diameter is less than the internal diameter of the working space 17. Furthermore the actuating device 23 includes a diaphragm 55, impermeable to air made of elastic and flexible material, by means of which the valve operating member 18 is suspended in a axially movable fashion on the valve housing 1. Preferably, it is made of a material with rubber-elastic properties. It is responsible for a fluid-tight separation between the control chamber 24 and the counter-pressure chambers 25.

The diaphragm 55 depicted in FIG. 2 has its outer edge 56 fixed to the housing all the way round. Preferably it is clamped in place between the intermediate plate 4 and the terminating plate 5.

The diaphragm 55 furthermore possesses a central opening 57 into which the terminal section 22 of the valve operating member 18 is inserted. It is held in place here by the two actuating disks 54 and 54' which clamp the edge 58 of the opening 57 between them.

At least the radially outer zones of the diaphragm 55 constitute a moving wall section of the control chamber 24 and of the counter-pressure chamber 25. It is, like the actuating disks 54 and 54' as well, subject to the pressure obtaining in the two connections 24 and 25.

In order to ensure that the diaphragm 55 is able to readily deform during control movements, the annular gap 59 allowing such movement between the two actuating disks 54 and 54' widens radially outward.

The axial end surface 63, opposite to the second valve seat 36, of the second valve member 38 is acted upon by the fluid under pressure in the counter-pressure chamber 25. It consequently constitutes a moving wall section of the counter-pressure 25. In order to compensate for the pressure forces occurring here, the end surface 63' opposite to the associated valve seat 35 of the other, first closure member 37, is subjected to the same pressure variations in the embodiment. For this purpose a pressure force compensating channel 64 is provided, which constantly connects the recess 43 with the secondary pressure port 9. This channel is in the present case constituted by a longitudinal groove, which is cut into the external periphery of that section of the valve operating member 18, on which the first closure member 37 runs longitudinally. The two end surfaces 63 and 63' are of equal size.

The pressure force compensating channel 64 could be also arranged in the valve housing or in the interior of the valve operating member 18. The connecting channel 52 could as well be formed in the interior of the valve operating member 18. It would be feasible for example to arrange the channels as indicated in chained lines in FIG. 2, a channel 65 running along inside the valve operating member 18 opening at one end at the recess 43 and at the other end at the counter-pressure chamber 25, and a branch channel 66 starting from this channel 65 being open toward the intermediate section 28.

The pressure control valve possesses a good regulation factor, since the two closure members 37 and 38 are mechanically decoupled from one another so that if one closure member oscillates, the function of the other one will not be affected. Since there is pressure compensation, it suffices only to design the spring arrangements 42 to be so strong that they overcome any weight forces and any friction occurring. The friction occurring in the embodiment between the sealing rings 44 and 44' and the associated contact surface, integral with the housing, only acts functionally in one direction so that hysteresis of the valve is not affected.

On the whole the valve operates very stably, something making itself felt in control circuits, wherein on the basis of this design principle higher degrees of accuracy and a substantially reduced tendency to oscillate are to be noted.

Pressure force compensation is also because the two valve seats 35 and 36 are designed with the same size. Owing to suspension on a diaphragm (55) friction-free force transmission is possible. Owing to the resilient enhancing effect of the spring device 53 it is possible to ensure that there is a pressure-less state at the secondary pressure port 9.

We claim:

1. A pressure control valve comprising a primary port for the supply of fluid, a pressure controlled secondary pressure port for connection with a load, a venting port and furthermore a valve operating means which is able to be positioned by means of a variable control pressure, obtaining in a control chamber, in different positions of control including a neutral setting, at least one supply setting and at least one venting setting, the secondary pressure port being in the neutral setting separated both from the primary pressure port and also from the venting port, whereas in the possible supply and venting settings it is connected either with the primary pressure port or with the venting port and simultaneously is separated from the respectively other port, wherein the valve operating device is so subjected to a mechanical spring device opposing the direction of action of the control pressure that if ambient pressure obtains in the control chamber it automatically assumes a basic setting, which is the same as a venting setting, further comprising a valve housing in which two transfer openings are defined connecting the secondary pressure port on the one hand with the primary pressure port and on the other hand with the venting port, such transfer openings being surrounded by a valve seat integral with the housing, the valve operating device comprising two independently moving closure members associated respectively with one of the valve seats and biased resiliently toward a closed setting closing the associated transfer opening, and furthermore a valve operating member which is adapted to serve for actuation of the closure members and is able to be moved linearly under the action of the control pressure, and wherein the more especially rod-like valve operating member is suspended using a flexible diaphragm in a moving manner on the valve housing, such diaphragm constituting a moving wall section of the control chamber, and further including means defining a counter-pressure chamber on the side of the diaphragm opposite to the control chamber, said counter-pressure chamber being in constant communication with the secondary pressure port.

2. The pressure control valve as set forth in claim 1 wherein the spring device serving for establishing the said basic setting is arranged in the counter-pressure chamber.

3. The pressure control valve as set forth in claim 2 wherein the spring device coaxially surrounds the valve operating member, it bearing at one end on a wall part integral with the housing of the counter-pressure chamber and at the other end on a radial projection provided on the valve operating member.

4. The pressure control valve as set forth in claim 1 wherein an end surface, facing axially away from the associated valve seat, of the one closure member constitutes a movable wall section of the counter-pressure chamber, the other closure member possessing an end surface, facing away from its associated valve seat axially, of the same size, such end surface being constantly subject to such secondary pressure via a pressure force compensation channel communicating with the secondary pressure port.

5. The pressure control valve as set forth in claim 1 wherein the transfer cross section available for the fluid between the secondary pressure port and the venting port is less in the basic setting than in the maximum venting setting possible during operation.

6. The pressure control valve as set forth in claim 1 wherein when the control chamber is pressure-less, on the basis of a mechanical force equilibrium between the spring device and at least one further spring arrangement acting on the valve operating device, the valve operating device is maintained in the basic setting.

7. The pressure control valve as set forth in claim 1 wherein the closure members and the valve operating member are adapted to be moved in relation to each other in the direction of setting of the valve operating member, an actuating portion, provided on the valve operating member, is associated with each closure member, such actuating portion being adapted to act on the associated closure member in the opening direction thereof, when the valve operating member, starting from the neutral setting, shifts toward the venting setting or the supply setting.

8. The pressure control valve as set forth in claim 7 wherein the valve operating member extends through the closure members, said closure members being slidingly mounted thereon.

9. The pressure control valve as set forth in claim 8 wherein the actuating portions of the valve operating member are constituted by two more especially collar-like radial projections, which are arranged axially between the two closure members and, in accordance with the direction of the motion of the valve operating member, are adapted to lift the one or the other closure member from the associated valve seat.

* * * * *